United States Patent [19]

Krinickas, Jr.

[11] Patent Number: 4,621,210
[45] Date of Patent: Nov. 4, 1986

[54] ELECTRIC GENERATOR COOLING ARRANGEMENT

[75] Inventor: Alexander Krinickas, Jr., Rockford, Ill.

[73] Assignee: Sundstrand Corporation, Rockford, Ill.

[21] Appl. No.: 800,680

[22] Filed: Nov. 22, 1985

[51] Int. Cl.⁴ .............................................. H02K 1/32
[52] U.S. Cl. ...................................... 310/61; 310/54; 310/68 D
[58] Field of Search ..................... 310/68 R, 68 D, 54, 310/61, 58, 59, 64, 65, 90, 261; 363/141, 145; 357/76

[56] References Cited

U.S. PATENT DOCUMENTS

| | | | |
|---|---|---|---|
| 2,897,383 | 7/1959 | Barrows | 310/68 D |
| 3,480,810 | 11/1969 | Potter | 310/61 |
| 3,733,503 | 5/1973 | Potter | 310/54 |
| 4,322,030 | 3/1982 | Jacobson | 310/90 |
| 4,329,603 | 5/1982 | Ballard | 310/61 |

Primary Examiner—R. Skudy
Attorney, Agent, or Firm—Wood, Dalton, Phillips Mason & Rowe

[57] ABSTRACT

To provide a cooling arrangement for an electric generator capable of supplying oil to a cylindrical rotor cavity in relatively large quantity in order to maintain a predetermined flow rate therethrough while providing spray oil cooling to a rotating rectifier assembly, a stationary non-rotating oil transfer tube is provided. The oil transfer tube extends from one end of a generator housing within a rotating shaft in generally coaxial relation with the one end of the tube being in communication with an oil inlet through the housing and the other end of the tube mounted within a rotating fitting in the rotating shaft. Additionally, the oil transfer tube has a radially extending orifice for spraying oil passing through the tube into the path of travel of the rectifier assembly upstream of the rotating fitting and the rotating fitting has an opening for carrying the remainder of the oil passing through the oil transfer tube into the cylindrical rotor cavity within the rotating shaft downstream of the rectifier assembly.

20 Claims, 2 Drawing Figures

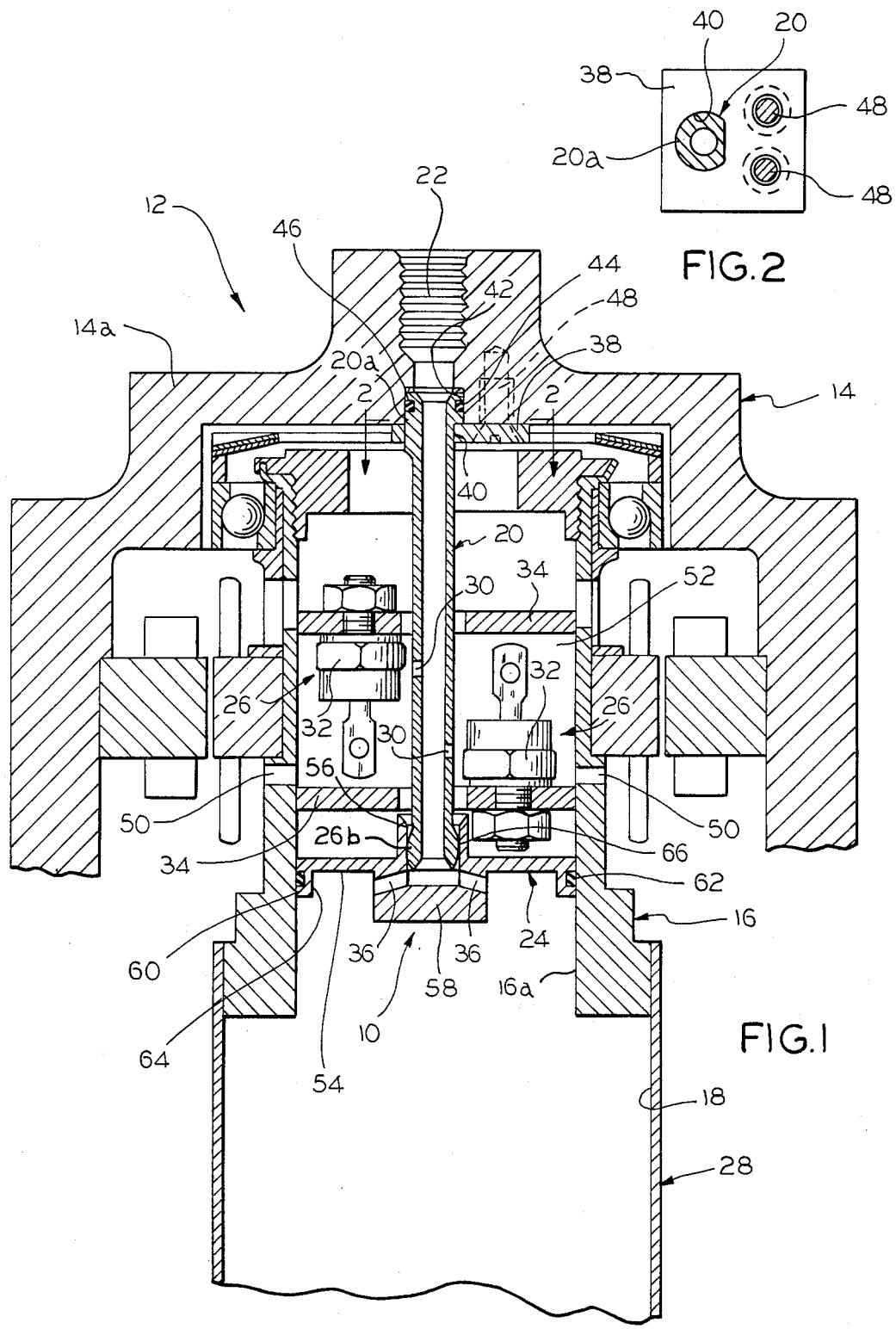

ns, i.e., to supply oil to a cylindrical

ELECTRIC GENERATOR COOLING ARRANGEMENT

FIELD OF THE INVENTION

This invention relates to a cooling arrangement for an electric generator, and more specifically, to a cooling arrangement to supply oil to two discrete locations in an electric generator.

BACKGROUND OF THE INVENTION

Many electric generators such as those commonly utilized in aircraft applications are oil cooled. The oil required for cooling in such generators must be transmitted from a stationary housing to a cylindrical rotor cavity containing the rotating field windings. In addition, a small quantity of oil is needed for cooling a rotating rectifier assembly remote from the rotating field windings and externally of the cylindrical rotor cavity.

To carry the oil for cooling the generator, a number of different arrangements have been proposed. For instance, one arrangement utilized an oil transfer tube that floated, i.e., was not fixed, relative to either the stationary generator housing or the cylindrical rotor cavity, but independent means were required for cooling the rotating rectifier assembly since the oil transfer tube merely served to carry oil from the housing to the cavity containing the field windings. Moreover, due to the floating nature of such oil transfer tubes, they may or may not rotate within the electric generator making them entirely unsuitable for cooling the rotating rectifier assembly.

Among other cooling arrangements in electric generators is that disclosed in Potter U.S. Pat. No. 3,733,503. This cooling arrangement utilizes a rotating rectifier assembly including a plurality of diodes which rotate with a hollow rotor shaft having a small orifice for each diode through which oil carried by the hollow rotor shaft is sprayed on finned surfaces of heat sinks associated with the diodes, and there is no suggestion of the manner of cooling the rotating field windings. Because the hollow rotor shaft rotates with the rotating rectifier assembly, it is necessary to utilize one orifice for each diode and, due to the fact that the oil is sprayed on the finned surfaces of the heat sinks, the cooling is inefficient due to surface thermal boundary effects.

Another cooling arrangement for an electric generator is disclosed in Dafler U.S. Pat. No. 3,629,627. The cooling arrangement of Dafler utilizes a rotating tubular coupling to carry a coolant to a plurality of cooling channels and provides an entirely separate spray nozzle through the stationary housing to direct coolant onto two groups of rectifier devices mounted within and adjacent the housing for rotation relative thereto. As a result, the electric generator is provided with a cooling arrangement which is complex, expensive, and inefficient.

Still another effort to provide a cooling arrangement for an electric generator is that of Jacobson et al U.S. Pat. No. 4,322,030. This cooling arrangement utilizes a stationary cooling feed tube for spraying oil through an orifice to contact the rotating interior surface of an elongated central cavity in an armature shaft. However, the stationary cooling feed tube is utilized solely for this purpose without any suggestion of multiple functions.

While overcoming problems of the type mentioned in connection with the prior art, it is desirable to provide a cooling arrangement for an electric generator utilizing an oil transfer tube fixed relative to a stationary generator housing. It is also desirable to provide such an oil transfer tube adapted to carry oil to a cylindrical rotor cavity for cooling rotating field windings in a large quantity sufficient to fill the rotor cavity while maintaining a predetermined flow rate therethrough. Further, it is desirable to provide a mounting for such an oil transfer tube to prevent rotation at the stationary generator housing end and to accommodate rotation relative to the cylindrical rotor cavity at the opposite end.

Among other desirable features of a cooling arrangement for an electric generator is to combine the cooling components for both the rotating field windings and the rotating rectifier assembly. It is still further desirable to utilize a single orifice for cooling a plurality of rotating diodes where the orifice is stationary and cools the diodes directly rather than through a heat sink in order to avoid surface thermal boundary effects. Additionally, it is desirable to provide an oil transfer tube in a cooling arrangement for an electric generator having two principal functiorotor cavity in relatively large quantity and to provide spray oil cooling to a rotating rectifier assembly.

The present invention is directed to overcoming the above stated problems and accomplishing the stated objects.

SUMMARY OF THE INVENTION

It is a principal object of the present invention to provide a new and improved cooling arrangement for an electric generator. More specifically, it is an object of the invention to provide an oil transfer tube mounted in a stationary fashion within a generator housing and capable of cooling both rectifying means and rotor means in an efficient manner. It is likewise an object of the invention to provide a cooling arrangement for an electric generator capable of supplying oil to a cylindrical rotor cavity in relatively large quantity in order to maintain a predetermined flow rate while providing spray oil cooling to a rotating rectifier assembly.

An exemplary embodiment of the invention achieves the foregoing objects in a cooling arrangement for an electric generator having a generator housing with a shaft mounted for rotation therein. The cooling arrangement includes an oil transfer tube extending from one end of the housing within the rotating shaft in generally coaxial relation with one end of the tube being mounted in stationary non-rotating relation to the one end of the housing in communication with an oil inlet through the housing and the other end of the tube mounted within a rotating fitting in the rotating shaft. With this construction, the oil transfer tube is adapted to carry oil from the oil inlet for cooling both rectifying means and rotor means in the generator housing of the electric generator.

In the exemplary embodiment, both the rectifying means and the rotor means are mounted within the shaft for rotation therewith. More specifically, the rectifying means is disposed about the oil transfer tube in spaced relation thereto and the rotor means is disposed in axially spaced relation to the oil transfer tube. In addition, the rectifying means is positioned upstream of the rotating fitting and the rotor means is positioned downstream of the rotating fitting.

With this construction, the oil transfer tube has a radially extending orifice for spraying oil passing therethrough into the path of travel of the rotating rectifying means. Due to the relative positioning of the rectifying means, rotating fitting, and rotor means, this occurs upstream of the rotating fitting and the rotor means prior to delivery of the remainder of the oil carried by the oil transfer tube to the rotor means. For this latter purpose, the rotating fitting has an opening for carrying oil passing through the oil transfer tube into the rotor means downstream of the rectifying means.

In a specific embodiment, the oil transfer tube is disposed within the rotating shaft in generally coaxial relation. The cooling arrangement also includes means for mounting the one end of the oil transfer tube in stationary non-rotating relation to the one end of the housing. The other end of the oil transfer tube cooperates with the rotating fitting to define bearing means for accommodating relative rotation therebetween with a minimum of oil leakage. The cooling arrangement further includes a separate chamber for the rectifying means defined by the rotating fitting and the one end of the generator housing. Still more specifically, the separate chamber for the rectifying means is preferably isolated from communication with the rotor means to define two separate and discrete areas for cooling.

Other objects and advantages of the present invention will become apparent from the following specification taken in connection with the accompanying drawing.

DESCRIPTION OF THE DRAWINGS

FIG. 1 is a cross sectional view of a cooling arrangement for an electrical generator in accordance with the invention; and FIG. 2 is a cross sectional view taken on the line 2—2 of FIG. 1.

DESCRIPTION OF THE PREFERRED EMBODIMENT

An exemplary embodiment of a cooling arrangement for an electric generator in accordance with the invention is illustrated in FIG. 1. The cooling arrangement 10 for the electric generator 12 includes a generator housing 14 having a hollow shaft 16 mounted for rotation therein and defining a generally cylindrical rotor cavity 18 together with an oil transfer tube 20 extending from one end 14a of the housing 14 within the rotating shaft 16 in generally coaxial relation with one end 20a of the tube 20 mounted in stationary non-rotating relation to the one end 14a of the housing 14 in communication with an oil inlet 22 through the housing 14 and with the other end 20b of the tube 20 mounted within a rotating fitting generally designated 24 in the rotating shaft 16. With this arrangement, the oil transfer tube 20 is adapted to carry oil for cooling both a rectifying means 26 and a rotor means 28 (shown schematically).

More particularly, the rectifying means 26 is mounted within the shaft 16 for rotation therewith and the rotor means 28 is also mounted within the shaft 16 for rotation therewith. The rectifying means 26 is disposed about the oil transfer tube 20 in spaced relation thereto with the rotor means 28 being disposed in axially spaced relation to the oil transfer tube 20. Additionally, the rectifying means 26 is positioned upstream of the rotating fitting 24 and the rotor means 28 is positioned downstream of the rotating fitting 24.

As shown, the oil transfer tube 20 includes at least one radially extending orifice 30 for spraying oil passing therethrough into the path of travel of the rotating rectifying means 26. In the specific embodiment illustrated, there are a pair of rectifying means 26 in axially spaced relation within the rotating shaft 16 and a corresponding pair of radially extending orifices 30 therefor, both of which spray oil directly onto one or more diodes 32 mounted on plates 34 within the rotating shaft 16. Also as shown, the rotating fitting 24 has at least one opening 36 for carrying the remainder of the oil passing through the oil transfer tube 20, i.e., the oil not otherwise sprayed onto the diodes 32 through the orifices 30, into the rotor means 28 within the rotating shaft 16 downstream of the rectifying means 26.

Referring to FIG. 2, the cooling arrangement 10 includes a retaining plate 38 adapted to secure the one end 20a of the oil transfer tube 20 to the one end 14a of the generator housing 14 in stationary non-rotating relation. The retaining plate 38 has an opening 40 adapted to receive the one end 20a of the oil transfer tube 20 therein with the opening 40 being sized and shaped to prevent relative rotation therebetween, i.e. between the oil transfer tube 20 and the retaining plate 38. Preferably, the opening 40 in the retaining plate 38 is generally D-shaped with the one end 20a of the oil transfer tube 20 also being generally D-shaped to mate with the opening 40 in the retaining plate 38 downstream of the oil inlet 22.

As shown in FIG. 1, the oil inlet 22 comprises a bore in one end of the generator housing 14 which also has a counterbore as at 42 adapted to receive the generally cylindrical portion of the one end 20a of the oil transfer tube 20 adjacent the oil inlet 22. Moreover, seal means such as the O-ring 44 in the circumferential groove 46 is disposed between the generally cylindrical portion of the one end 20a of the oil transfer tube 20 and the counterbore 42 in the generator housing 14.

Because of the cooperation of the retaining plate 38 with the one end 20a of the oil transfer tube 20, the generally cylindrical portion of the one end 20a of the oil transfer tube 20 is retained in the counterbore 42. As previously discussed, the retaining plate 38 also maintains the oil transfer tube 20 in non-rotating relation relative to the generator housing 14 with the D-shaped opening 40 in general alignment with the counterbore 42 by reason of the mating D-shaped portion of the one end 20a of the oil transfer tube 20 and the D-shaped opening 40 in the retaining plate 38. As will be appreciated, the retaining plate 38 is adapted to be mounted to the one end 14a of the generator housing 14 by any conventional means including machine screws such as the one shown in phantom lines as at 48.

As previously mentioned, each of the rectifying means 26 preferably includes a plate 34 secured to the rotating shaft 16. Each of the plates preferably has a plurality of circumferentially spaced diodes 32 mounted thereon such that the radially extending orifices 30 in the oil transfer tube 20 are each disposed in alignment with the path of travel of the corresponding diodes 32. With this arrangement, the radially extending orifices 30 are adapted to spray oil directly on the diodes 32 as the diodes rotate about the oil transfer tube 20.

In order to drain the oil sprayed on the diodes 32, the rotating shaft 16 preferably includes one or more radially extending bores 50. As shown, the bores 50 are disposed upstream of the rotating fitting 24 and downstream of the oil inlet 22 to drain oil sprayed on the diodes 32 from the rotating shaft 16. Since the diodes 32 are disposed in a cylindrical rectifier chamber 52, the radially extending bores 50 must be provided in order to prevent a build up of oil in the cylindrical rectifier chamber 52.

Referring to FIG. 1, the rotating fitting 24 includes a generally circular plate 54 having a cylindrical sleeve 56 adapted to receive the other end 20b of the oil transfer tube 20. The oil carrying opening or openings 36, which preferably include a plurality of radial bores, communicate with the other end 20b of the oil transfer tube 20 through the cylindrical sleeve 56. It will also be seen that the rotating fitting 24 preferably includes a generally cylindrical boss 58 covering the downstream side of the cylindrical sleeve 56 and integral with the generally circular plate 54 with the bore or bores 36 extending generally radially through the boss 58, as shown. The rotating fitting 24 further includes a circumferentially extending flange 60 cooperating with the inner surface 16a of the rotating shaft 16 for rotation therewith. As shown, an O-ring 62 is disposed within a circumferential groove 64 defined by the circumferentially extending flange 60 to maintain the cylindrical rectifier chamber 52 in relatively sealed relation to the cylindrical rotor cavity 18.

Still referring to FIG. 1, the outer surface of the other end 20b of the oil transfer tube 20 includes a spherically shaped enlargement 66. The spherically shaped enlargement 66 has a maximum diameter subtantially the same as the inner diameter of the cylindrical sleeve 56. With this construction, the spherically shaped enlargement 66 and the cylindrical sleeve 56 form bearing means accommodating relative rotation therebetween.

As will be appreciated, the spherically shaped enlargement 66 and the cylindrical sleeve 56 do not entirely prevent leakage therebetween, but the minimal leakage which does occur actually lubricates the bearing means formed between these components and accommodates relative rotation therebetween. As a result, the stationary oil transfer tube is not only capable of spraying oil directly on diodes rotating thereabout in a cylindrical rectifier chamber but also carries the remainder of oil in a large quantity sufficient to maintain a predetermined flow rate into and through a cylindrical rotor cavity.

While in the foregoing there has been set forth a preferred embodiment of the invention, it is to be understood that the invention is only to be limited by the spirit and scope of the appended claims.

I claim:

1. A cooling arrangement for an electric generator, comprising:
    a generator housing having a shaft mounted for rotation therein;
    an oil transfer tube extending from one end of said housing within said rotating shaft in generally coaxial relation, said oil transfer tube having one end mounted in stationary non-rotating relation to said one end of said housing in communication with an oil inlet through said housing, said oil transfer tube having the other end mounted within a rotating fitting in said rotating shaft;
    rectifying means mounted within said shaft for rotation therewith, said rectifying means being disposed about said oil transfer tube in spaced relation thereto, said rectifying means being positioned upstream of said rotating fitting; and
    rotor means mounted within said shaft for rotation therewith, said rotor means being disposed in axially spaced relation to said oil transfer tube, said rotor means being positioned downstream of said rotating fitting;
    said oil transfer tube having a radially extending orifice for spraying oil passing through said oil transfer tube into the path of travel of said rotating rectifying means upstream of said rotating fitting;
    said rotating fitting having an opening for carrying oil passing through said oil transfer tube into said rotor means within said rotating shaft downstream of said rectifying means.

2. The cooling arrangement as defined by claim 1 including a retaining plate adapted to secure said one end of said oil transfer tube to said one end of said generator housing in stationary non-rotating relation.

3. The cooling arrangement as defined by claim 2 wherein said retaining plate has an opening adapted to receive said one end of said oil transfer tube therein, said opening in said retaining plate being sized and shaped to prevent relative rotation of said one end of said oil transfer tube.

4. The cooling arrangement as defined by claim 3 wherein said opening in said retaining plate is generally D-shaped, said one end of said oil transfer tube being generally D-shaped to mate with said D-shaped opening in said retaining plate downstream of said oil inlet, said one end of said oil transfer tube adjacent said oil inlet being generally cylindrical.

5. The cooling arrangement as defined by claim 4 wherein said oil inlet comprises a bore in one end of said generator housing, said generator housing having a counterbore adapted to receive said generally cylindrical portion of said one end of said oil transfer tube, and including seal means disposed between said generally cylindrical portion of said one end of said oil transfer tube and said counterbore in said generator housing.

6. The cooling arrangement as defined by claim 4 wherein said generator housing includes a counterbore adapted to receive said generally cylindrical portion of said one end of said oil transfer tube, said retaining plate maintaining said generally cylindrical portion of said one end of said oil transfer tube in said counterbore, said retaining plate also maintaining said oil transfer tube in stationary non-rotating relation relative to said generator housing.

7. The cooling arrangement as defined by claim 1 wherein said rectifying means includes a plate secured to said rotating shaft and having a plurality of circumferentially spaced diodes mounted thereon, said radially extending orifice in said oil transfer tube being disposed in alignment with the path of travel of said diodes, said radially extending orifice being adapted to spray oil directly on said diodes as said diodes rotate about said oil transfer tube.

8. The cooling arrangement as defined by claim 7 wherein said rotating shaft includes a radially extending bore upstream of said rotating fitting and downstream of said oil inlet to drain oil sprayed on said diodes from said rotating shaft.

9. The cooling arrangement as defined by claim 1 wherein said rotating fitting includes a generally circular plate having a cylindrical sleeve adapted to receive the other end of said oil transfer tube, said oil carrying opening in said rotating fitting communicating with the other end of said oil transfer tube through said cylindrical sleeve.

10. The cooling arrangement as defined by claim 9 including a generally cylindrical boss covering the downstream side of said cylindrical sleeve, said boss being integral with said generally circular plate, said oil carrying opening comprising a generally radial bore extending through said boss into communication with said cylindrical sleeve.

11. The cooling arrangement as defined by claim 9 wherein the outer surface of the other end of said oil transfer tube includes a spherically shaped enlargement, said spherically shaped enlargement having a maximum diameter substantially the same as the inner diameter of said cylindrical sleeve, said spherically shaped enlargement and said cylindrical sleeve forming bearing means accommodating relative rotation therebetween.

12. A cooling arrangement for an electric generator, comprising:

a generator housing having a shaft mounted for rotation therein;

an oil transfer tube extending from one end of said housing within said rotating shaft in generally coaxial relation, and including means for mounting one end of said oil transfer tube in stationary non-rotating relation to said one end of said housing in communication with an oil inlet through said housing, said oil transfer tube having the other end mounted within a rotating fitting in said rotating shaft;

said rotating fitting cooperating with the other end of said oil transfer tube to define bearing means for accommodating relative rotation therebetween;

rectifying means mounted within said shaft for rotation therewith, said rectifying means being disposed about said oil transfer tube in spaced relation thereto, said rectifying means being positioned upstream of said rotating fitting; and rotor means mounted within said shaft for rotation therewith, said rotor means being disposed in axially spaced relation to said oil transfer tube, said rotor means being positioned downstream of said rotating fitting;

said oil transfer tube having a radially extending orifice for spraying oil passing through said oil transfer tube into the path of travel of said rotating rectifying means upstream of said rotating fitting;

said rotating fitting having an opening for carrying oil passing through said oil transfer tube into said rotor means within said rotating shaft downstream of said rectifying means;

said rotating fitting cooperating with the one end of said generator housing, and said rotating shaft to define a separate chamber for said rectifying means, said separate chamber for said rectifying means being isolated from communication with said rotor means.

13. The cooling arrangement as defined by claim 12 wherein said rectifying means includes a plate secured to said rotating shaft and having a plurality of circumferentially spaced diodes mounted thereon, said radially extending orifice in said oil transfer tube being disposed in alignment with the path of travel of said diodes, said radially extending orifice being adapted to spray oil directly on said diodes as said diodes rotate about said oil transfer tube.

14. The cooling arrangement as defined by claim 13 wherein said rotating shaft includes a radially extending bore upstream of said rotating fitting and downstream of said oil inlet to drain oil sprayed on said diodes from said separate chamber within said rotating shaft.

15. The cooling arrangement as defined by claim 14 wherein said rotating fitting includes a generally circular plate having a cylindrical sleeve adapted to receive the other end of said oil transfer tube, said oil carrying opening in said rotating fitting communicating with the other end of said oil transfer tube through said cylindrical sleeve, the outer surface of the other end of said oil transfer tube being formed with a spherically shaped enlargement having a maximum diameter substantially the same as the inner diameter of said cylindrical sleeve, said spherically shaped enlargement and said cylindrical sleeve forming said bearing means accommodating relative rotation therebetween.

16. The cooling arrangement as defined by claim 15 including a generally cylindrical boss covering the downstream side of said cylindrical sleeve, said boss being integral with said generally circular plate, said oil carrying opening comprising a generally radial bore extending through said boss into communication with said cylindrical sleeve, said generally radial bore being adapted to direct oil flowing through said oil transfer tube onto said rotor means.

17. The cooling arrangement as defined by claim 12 wherein said mounting means for said oil transfer tube includes a retaining plate adapted to secure said one end of said oil transfer tube to said one end of said generator housing in stationary non-rotating relation, said retaining plate having an opening adapted to receive said one end of said oil transfer tube therein, said opening in said retaining plate being sized and shaped to prevent rotation of said one end of said oil transfer tube therein.

18. The cooling arrangement as defined by claim 17 wherein said opening in said retaining plate is generally D-shaped, said one end of said oil transfer tube being generally D-shaped to mate with said D-shaped opening in said retaining plate downstream of said oil inlet, said one end of said oil transfer tube adjacent said oil inlet being generally cylindrical.

19. The cooling arrangement as defined by claim 18 wherein said oil inlet comprises a bore in one end of said generator housing, said generator housing having a counterbore adapted to receive said generally cylindrical portion of said one end of said oil transfer tube, and including seal means disposed between said generally cylindrical portion of said one end of said oil transfer tube and said counterbore in said generator housing.

20. The cooling arrangement as defined by claim 19 wherein said generator housing includes a counterbore adapted to receive said generally cylindrical portion of said one end of said oil transfer tube, said retaining plate maintaining said generally cylindrical portion of said one end of said oil transfer tube in said counterbore, said retaining plate also maintaining said oil transfer tube in stationary, non-rotating relation relative to said generator housing.

* * * * *